United States Patent
Cuomo et al.

(10) Patent No.: US 7,356,613 B2
(45) Date of Patent: Apr. 8, 2008

(54) ROUTABLE APPLICATION PARTITIONING

(75) Inventors: Gennaro A. Cuomo, Cary, NC (US); Donald Francis Ferguson, Yorktown Heights, NY (US); William T. Newport, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 10/920,086

(22) Filed: Aug. 17, 2004

(65) Prior Publication Data

US 2006/0041565 A1 Feb. 23, 2006

(51) Int. Cl.
*G06F 15/173* (2006.01)

(52) U.S. Cl. .............. 709/242; 709/205; 709/232; 709/238; 709/245

(58) Field of Classification Search ............ 709/205, 709/232, 238, 242, 245
See application file for complete search history.

(56) References Cited

U.S. PATENT DOCUMENTS

| | | | | |
|---|---|---|---|---|
| 5,774,668 A * | 6/1998 | Choquier et al. | ........... | 709/223 |
| 5,805,822 A * | 9/1998 | Long et al. | ........... | 709/232 |
| 6,052,711 A * | 4/2000 | Gish | ........... | 709/203 |
| 6,097,718 A * | 8/2000 | Bion | ........... | 370/351 |
| 6,314,501 B1 * | 11/2001 | Gulick et al. | ........... | 711/153 |
| 6,330,616 B1 * | 12/2001 | Gioquindo et al. | ........... | 709/236 |
| 6,539,435 B2 * | 3/2003 | Bolmarcich et al. | ........... | 719/310 |
| 6,687,735 B1 * | 2/2004 | Logston et al. | ........... | 709/203 |
| 6,747,985 B1 * | 6/2004 | Lovette | ........... | 370/460 |
| 6,813,637 B2 * | 11/2004 | Cable | ........... | 709/226 |
| 7,186,181 B2 * | 3/2007 | Rowe | ........... | 463/42 |
| 2002/0138594 A1 * | 9/2002 | Rowe | ........... | 709/219 |
| 2004/0236860 A1 * | 11/2004 | Logston et al. | ........... | 709/230 |
| 2006/0031242 A1 * | 2/2006 | Hall et al. | ........... | 707/101 |
| 2006/0080273 A1 * | 4/2006 | Degenaro et al. | ........... | 707/1 |

* cited by examiner

*Primary Examiner*—Michael Won
(74) *Attorney, Agent, or Firm*—Owen J. Gamon (57) ABSTRACT

A method, apparatus, system, and signal-bearing medium that in an embodiment determine the active partitions of an application and assign the active partitions among servers via a routing table. The routing table is sent to a client, who uses the routing table to send requests and/or messages to the active partitions. In an embodiment, the routing table includes identifiers of the active partitions and the associated partitions. If one of the servers fails or if the partitions have a loading imbalance, the partitions are reassigned via the routing table.

6 Claims, 12 Drawing Sheets

| ROUTING TABLE 152 | | |
|---|---|---|
| PARTITION (325) | SERVER (330) | |
| PARTITION A | SERVER A | 305 |
| PARTITION B | SERVER A | 310 |
| PARTITION C | SERVER B | 315 |
| PARTITION D | SERVER A, SERVER B | 320 |

ROUTABLE APPLICATION PARTITIONING

FIELD

An embodiment of the invention generally relates to a computer network. In particular, an embodiment of the invention generally relates to dynamic routable application partitioning.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs. Years ago, computers were isolated devices that did not communicate with each other. But, today computers are often connected in networks, such as the Internet or World Wide Web, and a user at one computer, often called a client, may wish to access information at multiple other computers, often called servers, via a network.

Clients often wish to send requests or messages to applications that are distributed or clustered across multiple servers. Several different types of algorithms are currently used to choose which server receives which request. In a first example, a load-balancing algorithm distributes incoming requests to multiple servers, so that each server has roughly the same workload. In a second example, a temporary affinity algorithm routes all requests that are associated with a single transaction to the server where the transaction started. In a third example, a cached session-state algorithm routes requests from clients to the server where that client's state (e.g., a hypertext transport protocol state) is currently cached.

But, for online transaction processing (OLTP) applications, those three example algorithms may not result in good performance because OLTP applications often receive a wide variety of different types of requests, which no single algorithm handles expeditiously. For example, some OLTP requests are dependent on accessing a specific state, such as messages received for data relevant to a subset of the incoming requests. In another example, some types of OLTP applications require requests to be processed in order. Such applications are typically not possible to cluster, and they result in a single server hosting the application, which only scales vertically and also represents a single point of failure.

Without a better way to distribute requests across multiple servers, users will continue to suffer from degraded performance. Although the aforementioned problems have been described in the context of OLTP applications, any type of application may suffer from these problems.

SUMMARY

A method, apparatus, system, and signal-bearing medium are provided that in an embodiment determine the active partitions of an application and assign the active partitions among servers via a routing table. The routing table is then sent to a client, who uses the routing table to send requests and/or messages to the active partitions. In an embodiment, the routing table includes identifiers of the active partitions and the associated partitions. If one of the servers fails or if the partitions have a loading imbalance, the partitions are reassigned via the routing table.

DETAILED DESCRIPTION

Figure 1:
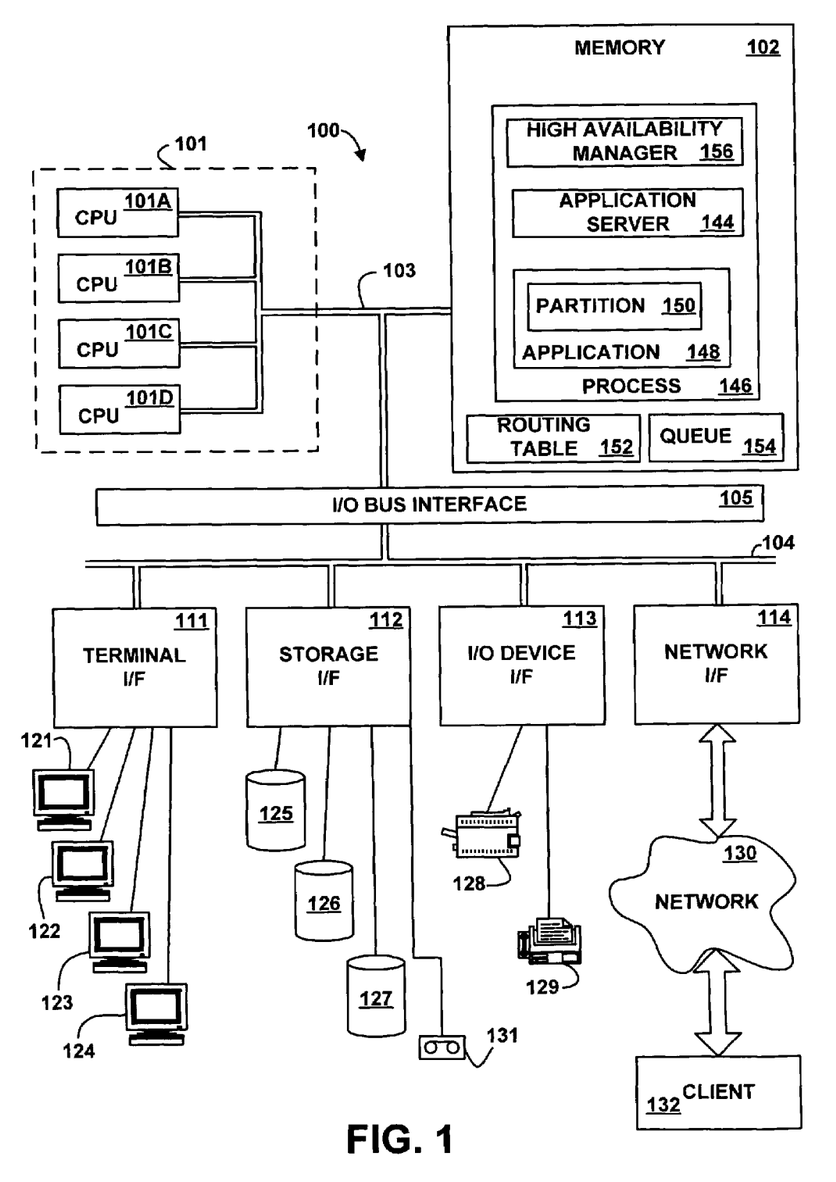
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to clients 132 via a network 130, according to an embodiment of the present invention. The computer system 100 acts as a server to the clients 132. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs r sets of CPUs, as is known in any of various so-called non-uniform memory access (NUMA) computer architectures.

The memory 102 includes a process 146, a routing table 152, and a queue 154. Although the process 146, the routing table 152, and the queue 154 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the process 146, the routing table 152, and the queue 154 are all illustrated as being contained within the memory 102 in the computer system 100, these elements are not necessarily all completely contained in the same storage device at the same time.

The process 146 may include an application server 144, multiple applications 148, and a high-availability manager 156. In an embodiment, the applications 148 use the queue 154 as a communication path. In another embodiment, the applications 148 use a synchronous request method as a communication path. The applications 148 may have an API (Application Programming Interface) that reports performance metrics, statistics, and operation completions related to partitions to the application server 144. The set of operations depends on the application 148. These statistics are used to allow the user to obtain statistics about the performance of an application's partitions at runtime. These statistics can be displayed in a flexible manner and analyzed to provide a wide range of statistics for the application 148.

Each of the applications 148 is divided into multiple partitions 150. Each of the partitions 150 may have a unique name as well as additional attributes (e.g., name/value pairs) supplied by the application 148 when the application 148 starts the partitions 150. The additional attributes may include fixed attributes as well as application-defined attributes. The fixed attributes may include the name of the application 148 and the name of a set of user exits that define the partition. The naming of the partition 150 allows the flexible matching of activation policies at runtime as well as easier administration, as it allows a set of partitions 150 to be selected that match a set of supplied attributes as well as a find-by-partition name type search. The set of attributes is flexible and may vary from application to application. The high availability manager 156 searches for a policy that matches the attributes and uses the policy to determine how to activate the partition 150 on the servers 100.

The partitions 150 can be moved between the servers 100 by an administrator via an administrative command. Partitions can also be added at runtime if the application 148 calls an API indicating that a new partition should be created at a given point in time. Existing partitions can also be removed using this API set. If a single server adds or removes a partition, then all online servers are impacted by this change.

In an embodiment, the application 148 includes instructions capable of executing on the processor 101 or statements capable of being interpreted by instructions executing on the processor 101 to perform the functions as further described below with reference to FIGS. 4A and 7. The configuration of the processes 146, the applications 148, and the partitions 150 is further described below with reference to FIG. 2.

The routing table 152 describes which of the partitions 150 are active on which of the servers 100. In an embodiment, the routing table 152 includes an administrative interface that allows a user to view the status of the partitions 150. The administrative interface may filter the partitions in the routing table 152 to a manageable set. The clients 132 send messages and requests to the servers 100 via the queue 154 based on the routing table 152. The routing table 152 is further described below with reference to FIG. 3.

The application server 144 manages the allocation of the partitions 150 to the servers 100 via the routing table 152. In an embodiment, the application server 144 includes instructions capable of executing on the processor 101 or statements capable of being interpreted by instructions executing on the processor 101 to perform the functions as further described below with reference to FIGS. 4A, 4B, 5, 6, 9, 10, and 11. In another embodiment, the application server 144 may be implemented in microcode. In yet another embodiment, the application server 144 may be implemented in hardware via logic gates and/or other appropriate hardware techniques, in lieu of or in addition to a processor-based system.

The high-availability manager 156 monitors the health of the servers 100 and ensures the policy associated with the partitions 150 is being enforced. One policy is a static policy where each of the partitions 150 only run on a single server and partitions are not reassigned to another server on a failure. Another policy is referred to as "1 to N" with options of "preferred server list," "preferred servers only," and "fail back." With the 1 to N policy, a single server can host a partition at a time. The preferred servers only option indicates whether only the preferred servers can host the partition. If the preferred servers only option is specified, then even if a non-preferred server is available and the partition is offline, it will not failover. If the preferred server list option is specified, then the most preferred server is where the partition runs. If the fail back option is specified and a more preferred server comes online, then the high-availability manager 156 moves the partition to the more preferred server.

The high-availability manager 156 may also use quorums to only activate partitions when the majority of the cluster servers are visible to the high-availability manager 156. If the high-availability manager 156 loses the quorum, then the high-availability manager 156 terminates any active partitions. A cluster of servers with majority quorum may use additional hardware to terminate any cluster servers that just went unresponsive to ensure that failover can be safely attempted. The high availability manager 156 may also use other quorum mechanisms such as a hardware tiebreaker to decide whether the set or sets have a quorum.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units.

The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed. The storage interface unit 112 may also support other types of devices, such as a tape device 131, an optical device, or any other type of storage device.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types.

The network interface 114 provides one or more communications paths from the computer system 100 to other digital devices and computer systems; such paths may include, e.g., one or more networks 130. In various embodiments, the network interface 114 may be implemented via a modem, a LAN (Local Area Network) card, a virtual LAN card, or any other appropriate network interface or combination of network interfaces.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The client 132 may further include some or all of the hardware components previously described above for the computer system 100. Although only one client 132 is illustrated, in other embodiments any number of clients may be present. The client 132, or a user of the client 132, desires to send messages and/or requests to the partitions 150.

It should be understood that FIG. 1 is intended to depict the representative major components of the computer system 100, the network 130, and the clients 132 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
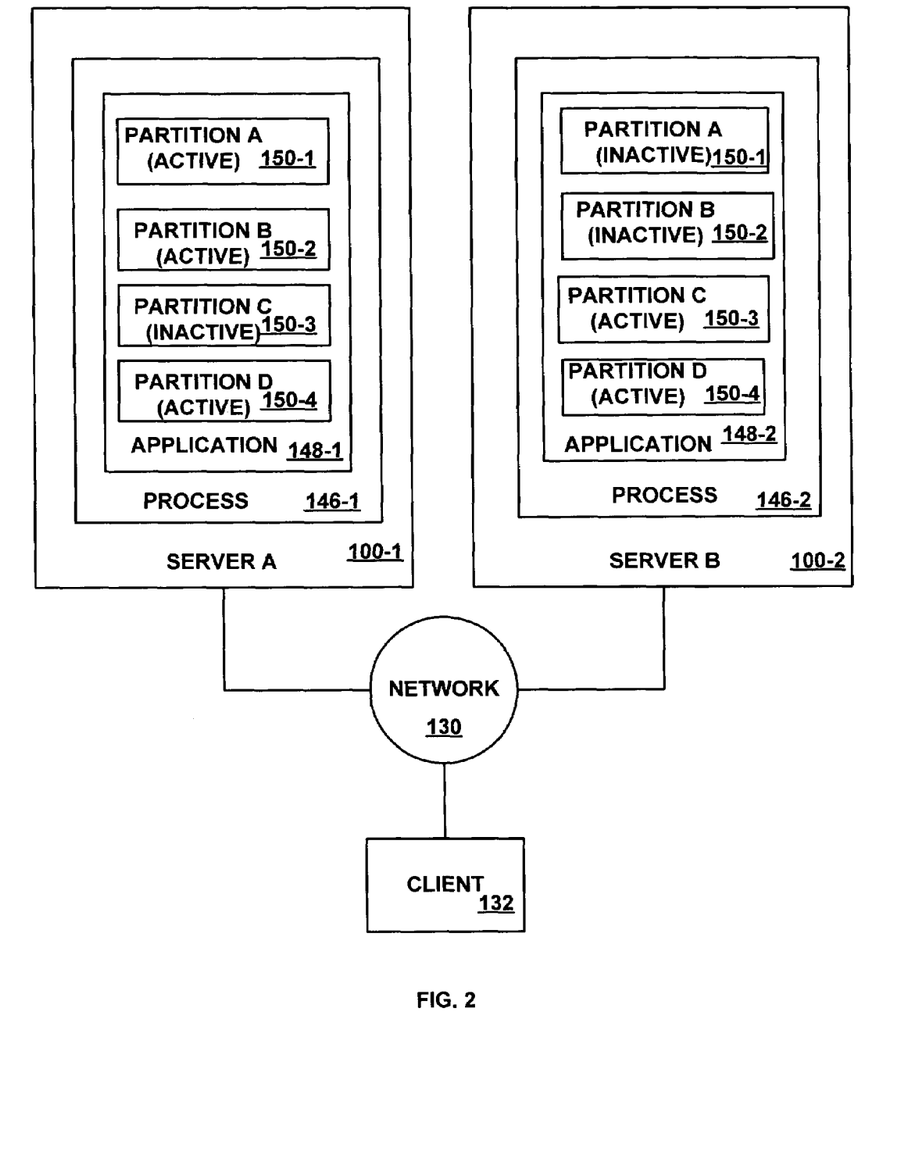
FIG. 2 depicts a block diagram of the example system, illustrating more detail of select components, according to an embodiment of the invention.

FIG. 2 depicts a block diagram of the example system, illustrating more detail of select components, according to an embodiment of the invention. The example system includes a server A 100-1 and a server B 100-2 (generically referred to as the server 100 in FIG. 1) connected to the client 132 via the network 130. The server A 100-1 includes process 146-1 (generically referred to as the process 146 in FIG. 1), which includes an application 148-1 (generically referred to as the application 148 in FIG. 1), which includes the partition A 150-1, the partition B 150-2, the partition C 150-3, and the partition D 150-4 (generically referred to as the partitions 150 in FIG. 1). The partition A 150-1, the partition B 150-2, and the partition D 150-4 are active in the server 100-1 while the partition C 150-3 is inactive in the server A 100-1. The server B 100-2 includes a process 146-2 (generically referred to as the process 146 in FIG. 1), which includes an application 148-2 (generically referred to as the application 148 in FIG. 1), which includes the partition A 150-1, the partition B 150-2, the partition C 150-3, and the partition D 150-4. The partition A 150-1 and the partition B 150-2 are inactive in the server 100-2 while the partition C 150-3 and the partition D 150-4 are active in the server 100-2.

In an embodiment, the partitions 150 have a scope attribute that modifies the set of candidate online servers, where the partitions 150 can be activated by the high-availability manager 156. In various embodiments, the scope attribute may be cluster scoped or node scoped. Cluster scoped means that the high-availability manager 156 matches each partition using the set of servers in the cluster as candidates for activation points. Node scoped means that the high-availability manager 156 matches the partition to each set of servers within a node in the cluster. A node is a set of servers on a single machine, and the routing table 152 has an entry for each node.

For example, for a node-scoped policy where the policy is exactly one active partition, a cluster of five nodes, where all nodes are online, has five active partitions. But, for cluster-scoped policy in the same example the node has one active partition.

Figure 3:
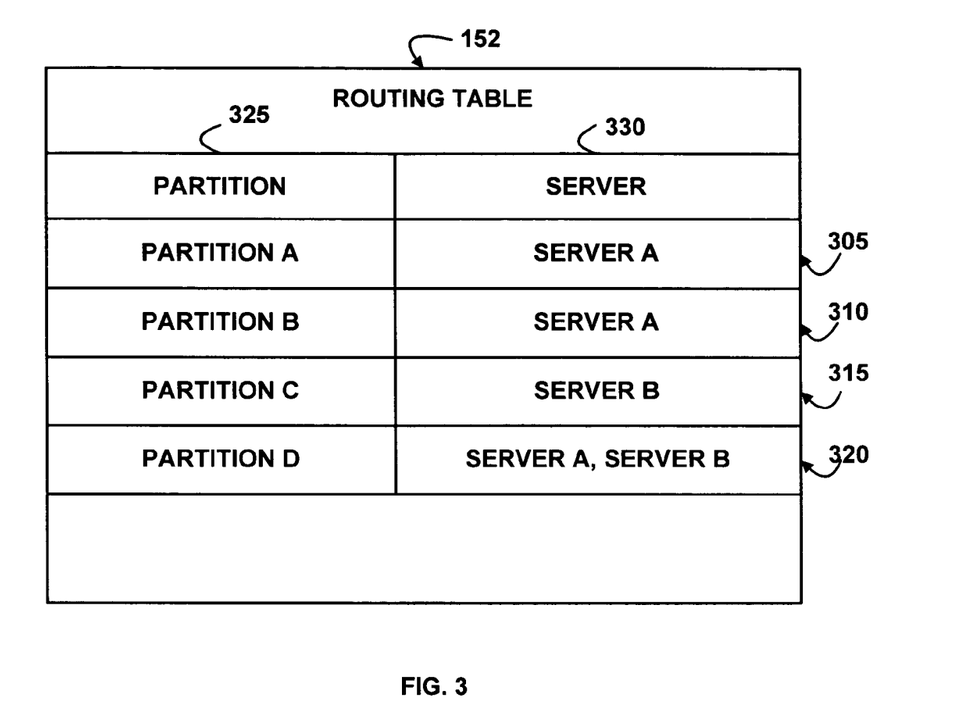
FIG. 3 depicts a block diagram of an example data structure for a routing table, according to an embodiment of the invention.

FIG. 3 depicts a block diagram of an example data structure for the routing table 152, according to an embodiment of the invention. The routing table 152 includes entries 305, 310, 315, and 320, but in other embodiments any number of entries with any appropriate data may be present. Each of the entries 305, 310, 315, and 320 includes a partition field 325 and a server field 330. The partition field 325 includes an identifier of an active partition 150. The server field 330 identifies a server 100 on which the associated partition in the entry is active. For example, the entry 305 indicates that the partition A 150-1 is active on the server A 100-1; the entry 310 indicates that the partition B 150-2 is active on the server A 100-1; the entry 315 indicates that the partition C 150-3 is active on the server B 100-2; and the entry 320 indicates that the partition D 150-4 is active on both the server A 100-1 and the server B 100-2. Thus, partition D 150-4 has a 2 to N or a static policy that causes the high-availability manager 156 (FIG. 1) to run the partition D 150-4 on both the server A 100-1 and the server B 100-2.

Figure 4A:
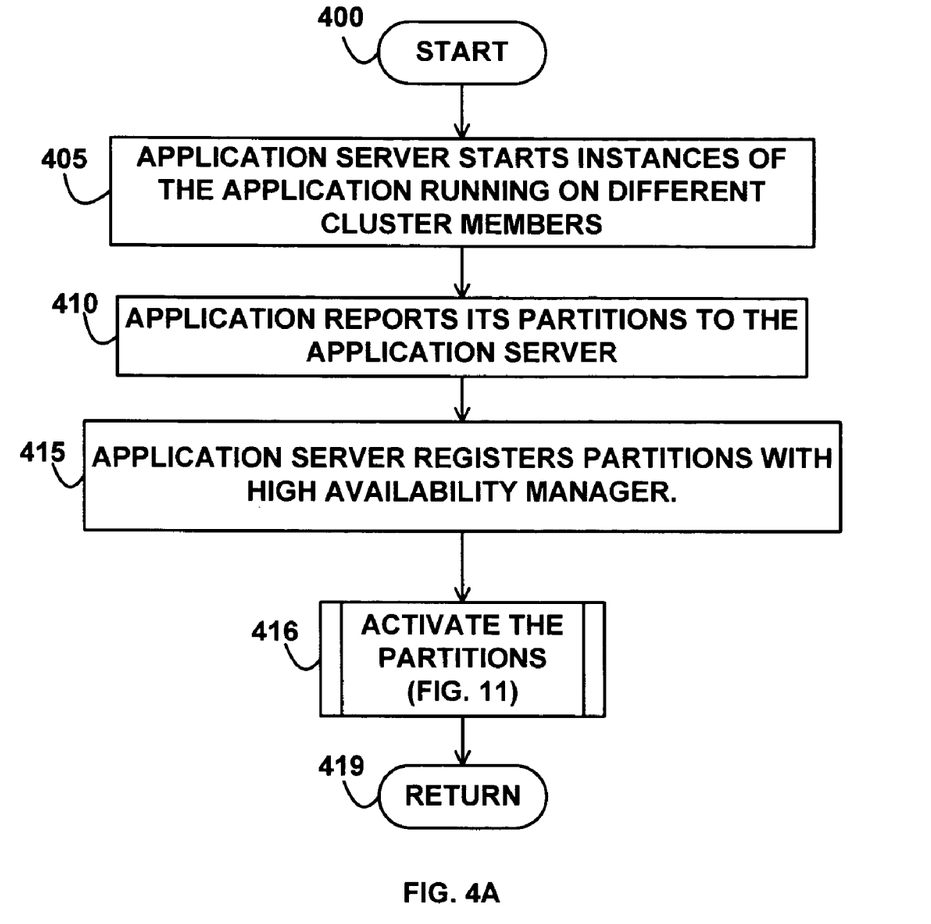
FIG. 4A depicts a flowchart of example processing for assigning partitions to servers.

FIG. 4A depicts a flowchart of example processing for assigning the partitions 150 to servers 100 and routing requests to a selected partition, according to an embodiment of the invention. Control begins at block 400. Control then continues to block 405 where the application server 144 starts instances of the application 148 (e.g., the applications 148-1 and 148-2) running on different cluster members, such as the servers 100 (e.g. on the servers 100-1 and 100-2).

Control then continues to block 410 where the application 148 reports its active partitions to the application server 144. In various embodiments, the application 148 reports its active partitions using business logic inside the application 148 or statically using a descriptor associated with the application 148. In another embodiment, the application server 144 determines the active partitions at the application 148 automatically by observing behavior of the application 148 and then creating partitions dynamically, in order to improve the performance of the application 148. The static and automatic approaches allow any application 148 that is not partition aware to potentially be optimized by the application server 144 to perform better through the use of partitioning.

Control then continues to block 415 where the application server 144 registers the partitions 150 and the policies of the partitions 150 with the high-availability manager 156. Control then continues to block 416 where the partitions are activated as further described below with reference to FIG. 11. Control then continues to block 419 where the logic of FIG. 4A returns.

Figure 4B:
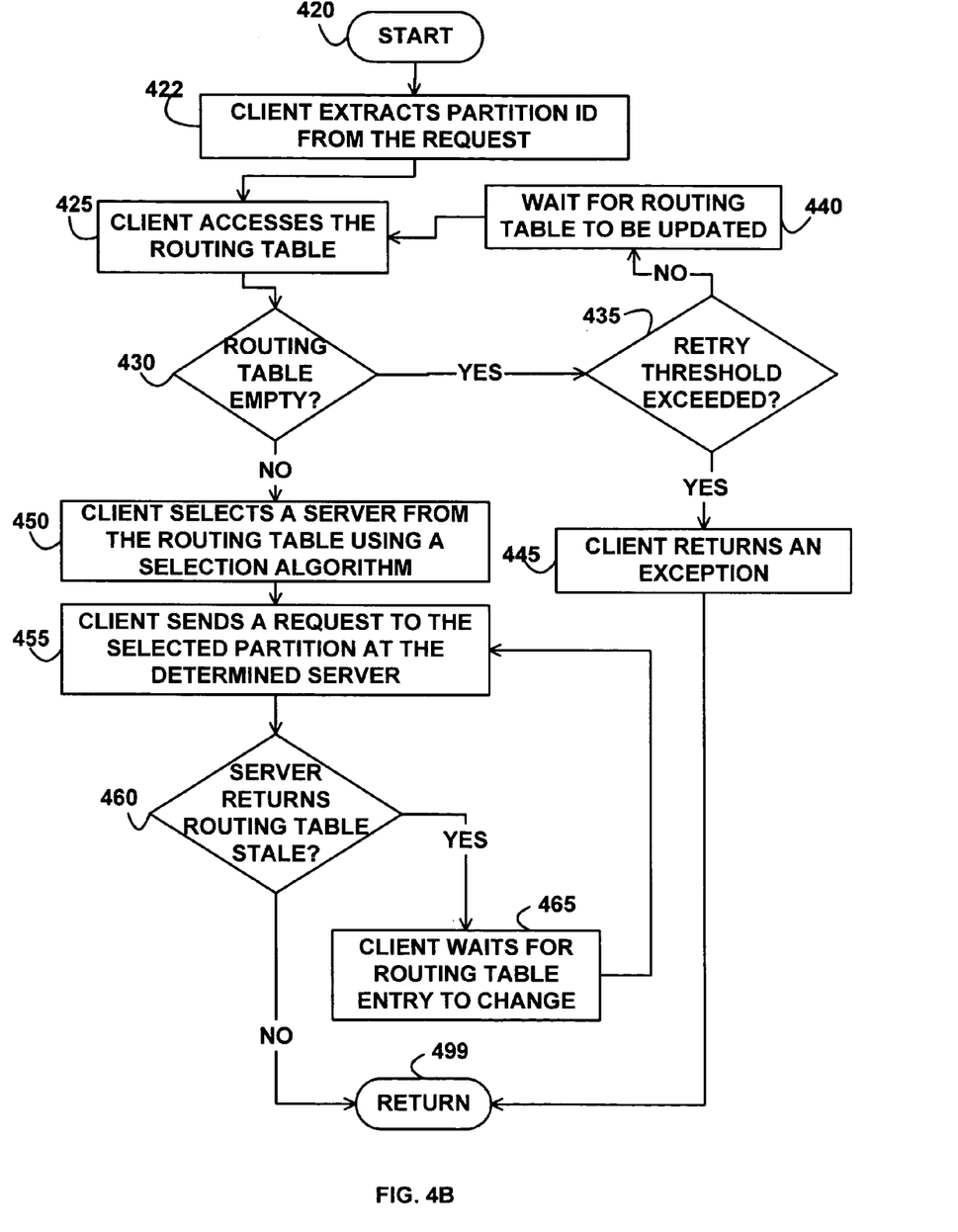
FIG. 4B depicts a flowchart for routing requests to a selected partition, according to an embodiment of the invention.

FIG. 4B depicts a flowchart for routing requests to a selected partition, according to an embodiment of the invention. Control begins at block 420. Control then continues to block 422 where the client 132 extracts a partition identifier from the request. Control then continues to block 425 where the client 132 accesses the routing table 152 using the extracted partition identifier. In an embodiment, the application server 144 sends the routing table 152 to the client 132, which caches the routing table 152 locally. Control then continues to block 430 where client 132 determines whether the routing table 152 is empty.

If the determination at block 430 is true, then the routing table 152 is empty, so control continues to block 435 where the client 132 determines whether a retry threshold is exceeded. If the determination at block 435 is true, then the retry threshold has been exceeded, so control continues to block 445 where the client 132 returns an exception. Control then continues to block 499 where the logic of FIG. 4B returns.

If the determination at block 435 is false, then the retry threshold has not been exceeded, so control continues to block 440 where the client 132 waits for the routing table 152 to be updated. Control then returns to block 425, as previously described above.

If the determination at block 430 is false, then the routing table 152 is not empty, so control continues to bock 450 where the client 132 determines the server to receive the request based on the partition using the entry in the routing table 152 associated with the partition using a selection algorithm, such as a round-robin algorithm, a weighted algorithm, a random algorithm, or any other appropriate selection algorithm. Control then continues to block 455 where the client 132 sends the request to the selected partition at the determined server. Control then continues to block 460 where the client 132 determines whether the server 100 returns, in response to the request, an indication that the routing table 152 is stale. If the determination at block 460 is true, then the routing table 152 is stale, so control continues to block 465 where the client 132 waits for the entry in the routing table 152 that is associated with the partition to change. Control then returns to block 455, as previously described above.

If the determination at block 460 is false, then the routing table 152 is not stale, so control continues to block 499 where the logic of FIG. 4B returns.

Figure 5:
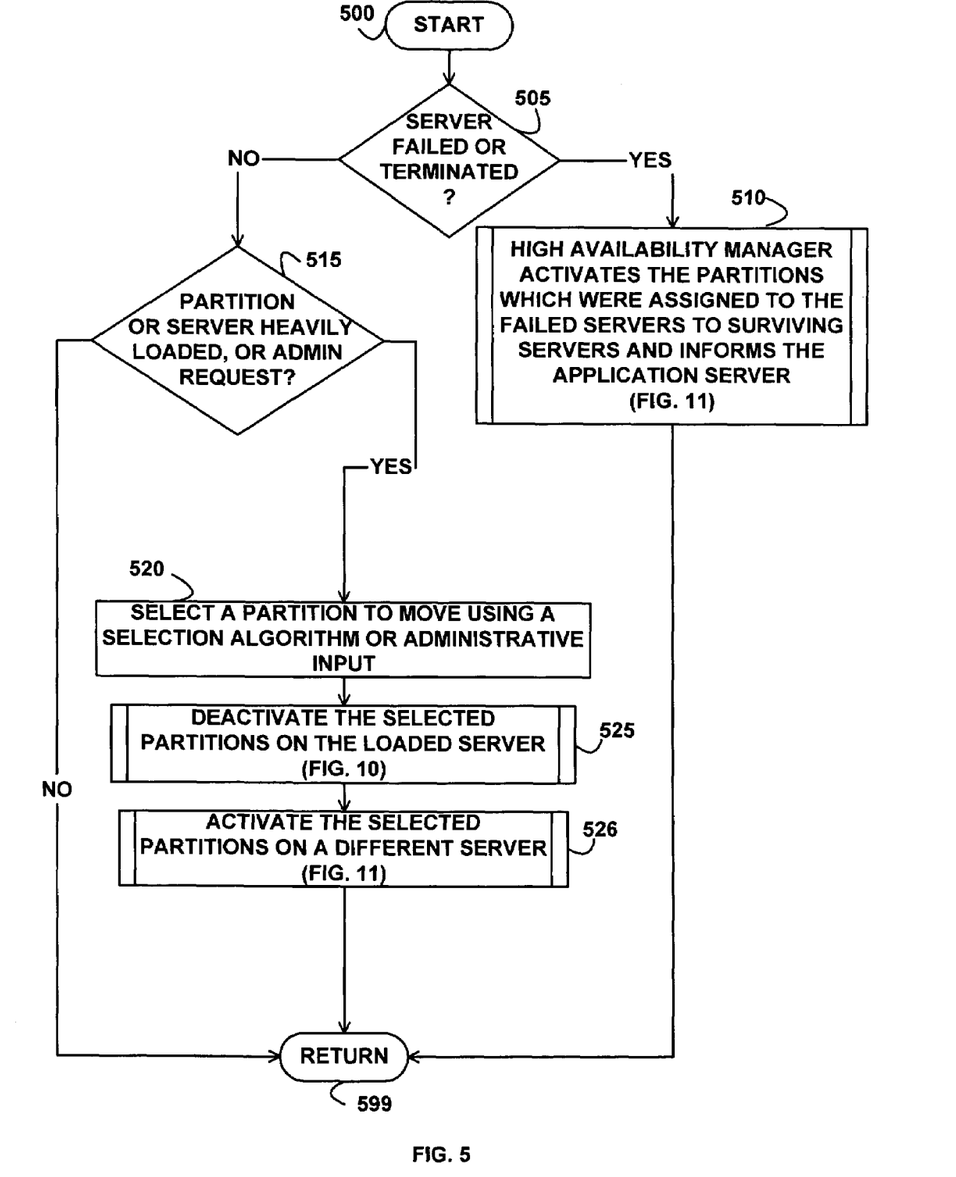
FIG. 5 depicts a flowchart of example processing for reassigning partitions among servers in response to a failure or an imbalance of loading among the partitions, according to an embodiment of the invention.

FIG. 5 depicts a flowchart of example processing for reassigning the partitions 150 among the servers 100 in response to a failure or an imbalance of loading among the partitions 150, according to an embodiment of the invention.

Figure 11:
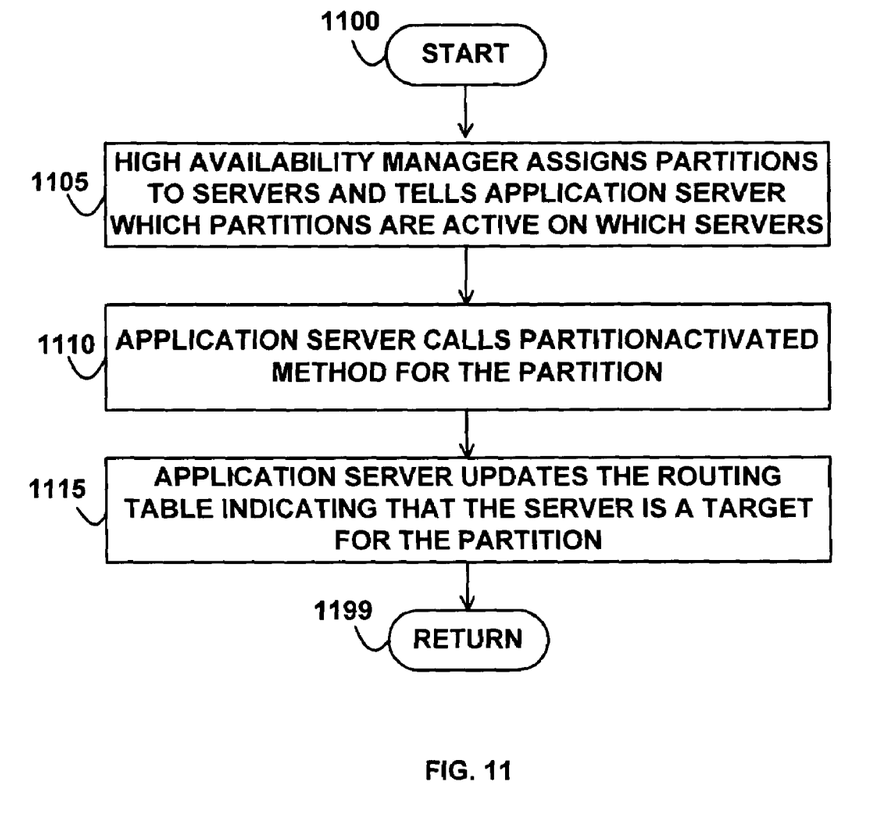
FIG. 11 depicts a flowchart of example processing for activating a partition, according to an embodiment of the invention.

Control begins at block 500. Control then continues to block 505 where the application server 144 determines whether a server 100 has failed or has been terminated. If the determination at block 505 is true, then the server 100 has failed or been terminated, so control continues to block 510 where the high-availability manager 156 activates the partitions that were assigned to the failed servers to a surviving server. For each partition that needs to be activated, the logic of FIG. 11 is invoked. Control then continues to block 599 where the logic of FIG. 5 returns.

If the determination at block 505 is false, then the server 100 has not failed or been terminated, so control continues to block 515 where the application server 144 determines whether a partition 150 or server 100 is heavily loaded, there is a loading imbalance among the partitions 150, or an administrator has requested that a partition be reassigned from a source to a destination server. In various embodiments, the application server 144 makes the determination at block 515 by determining whether the performance of the partition falls below a threshold, determining whether the performance of the partitions is imbalanced, determining whether the performance of the server 100 falls below a threshold, or whether response time experienced by the client 132 that is sending requests to the partition falls above a threshold. But, in other embodiments, any appropriate technique for determining whether the partition 150 on the server 100 is heavily loaded or imbalanced may be used.

If the determination at block 515 is true, then a partition 150 or server 100 is heavily loaded, the partitions 150 are imbalanced, or an administrative request has been received, so control continues to block 520 where the application server 144 selects a partition(s) to move from the heavily loaded or imbalanced server (the original server) using a selection algorithm or administrative input. If an administrative request has been received, then the request specifies the source and destination server. Control then continues to block 525 where the selected partition(s) on the original server are deactivated, as further described below with reference to FIG. 10. Control then continues to block 526 where the selected partition(s) are activated on a different, less loaded, server (the new server or the destination server), as further described below with reference to FIG. 11.

The application server 144 rejects future requests from the client 132 for that partition at the original server and sends an exception to the clients 132 indicating that a failover is in progress. The original server may either abort in-flight work for that partition or let the in-flight work continue to completion, depending on how the application 148 is configured. Aborted requests return an exception to the requesting client 132 indicating a failure due to failover. If the application 148 becomes unresponsive during its time processing in-flight work, then the process 146 is terminated to allow failover to proceed.

Control then continues to block 599 where the logic of FIG. 5 returns.

If the determination at block 515 is false, then a partition 150 is not heavily loaded, or the partitions are not imbalanced, so control continues to block 599 where the logic of FIG. 5 returns.

Figure 6:
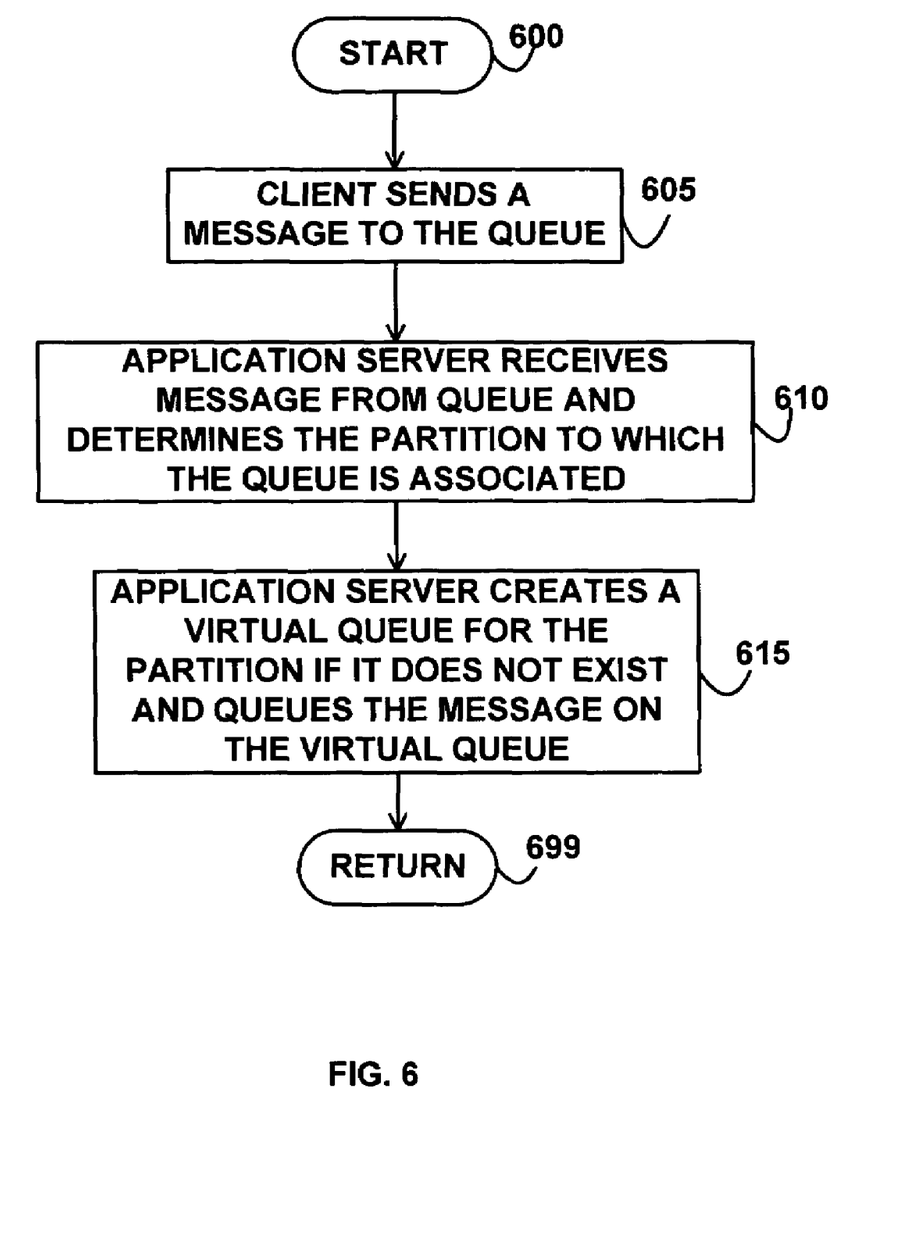
FIG. 6 depicts a flowchart of example processing for sending messages to queues, according to an embodiment of the invention.

FIG. 6 depicts a flowchart of example processing for sending messages to the queues 154, according to an embodiment of the invention. Messages are different from the requests of FIG. 4B in that messages are asynchronous while requests are synchronous.

Control begins at block 600. Control then continues to block 605 where the client 132 sends a message to the queue 154. Control then continues to block 610 where the application server 144 receives the message from the queue 154 and determines the partition 150 to which the queue 154 is associated. Control then continues to block 615 where the application server 144 creates a virtual queue for the partition 150 if a virtual queue does not already exist for that partition. The application server 144 further queues the received message on the virtual queue associated with the partition. The virtual queues are dynamic and are created on demand based on the partitions observed in the incoming messages. The application server 144 names the virtual queues after a context derived from the messages, the original queue name, and the associated partition 150. Control then continues to block 699 where the logic of FIG. 6 returns.

Figure 7:
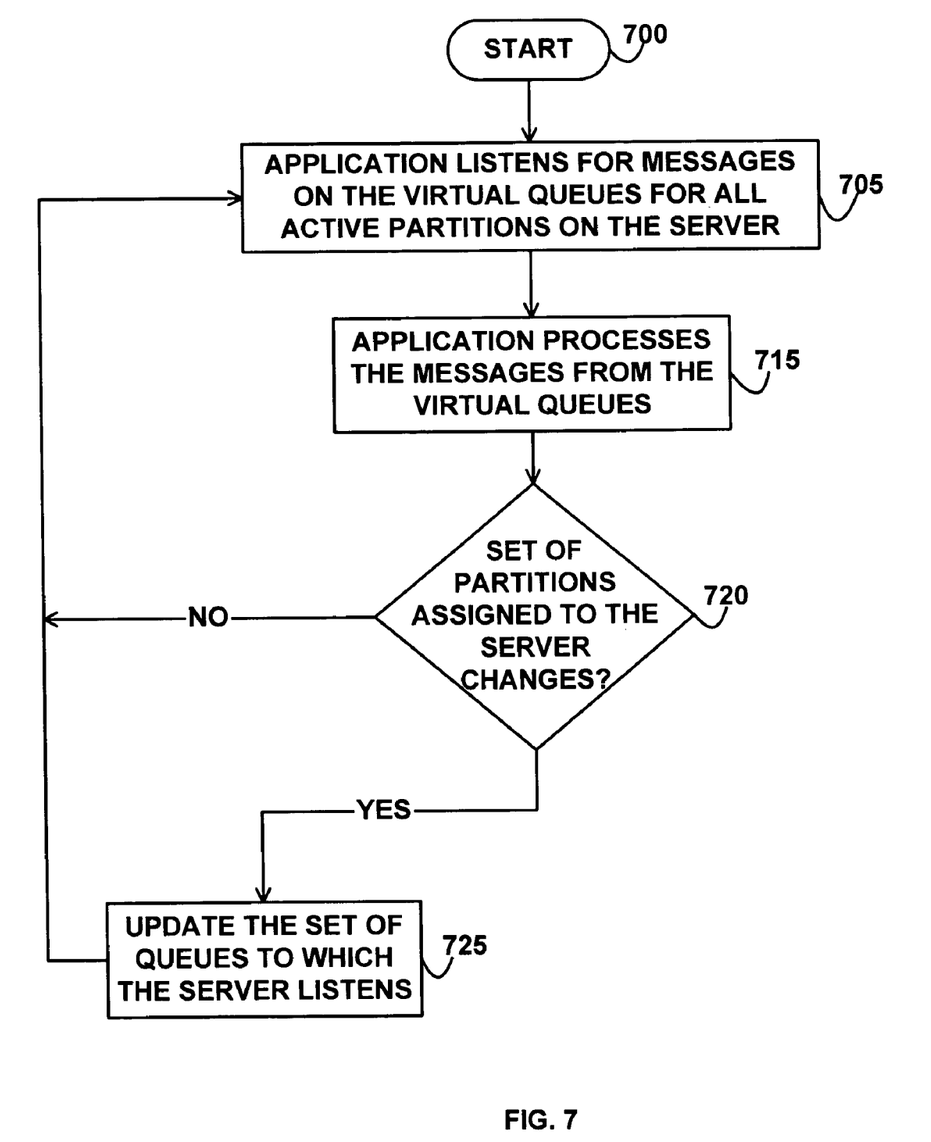
FIG. 7 depicts a flowchart of example processing for receiving messages, according to an embodiment of the invention.

FIG. 7 depicts a flowchart of example processing for receiving messages, according to an embodiment of the invention. Control begins at block 700. Control then continues to block 705 where the application 148 listens for messages on the virtual queues for all active partitions on the server 100 and receives a message. In an embodiment, the application 148 has one or more MDBs (Message Driven Beans), each of which listens for messages for any partitions assigned to its server 100. In various embodiments, the application 148 may have one MDB for each stream of messages (each stream partitioned into virtual queues), or multiple MDBS dedicated to different types of messages, e.g., one MDB is dedicated to ordered messages while another MDB is dedicated to inquiry messages.

Control then continues to block 715 where the application 148 processes the messages from the virtual queues. Control then continues to block 720 where the application server 144 determines whether the set of partitions assigned to the server 100 has changed. If the determination at block 720 is true, then control continues to block 725 where the application server 144 updates the set of queues to which the server 100 listens. Control then returns to block 705, as previously described above. If the determination at block 720 is false, then control returns to block 705, as previously described above.

Control then continues to block 799 where the logic of FIG. 7 returns.

Figure 8:
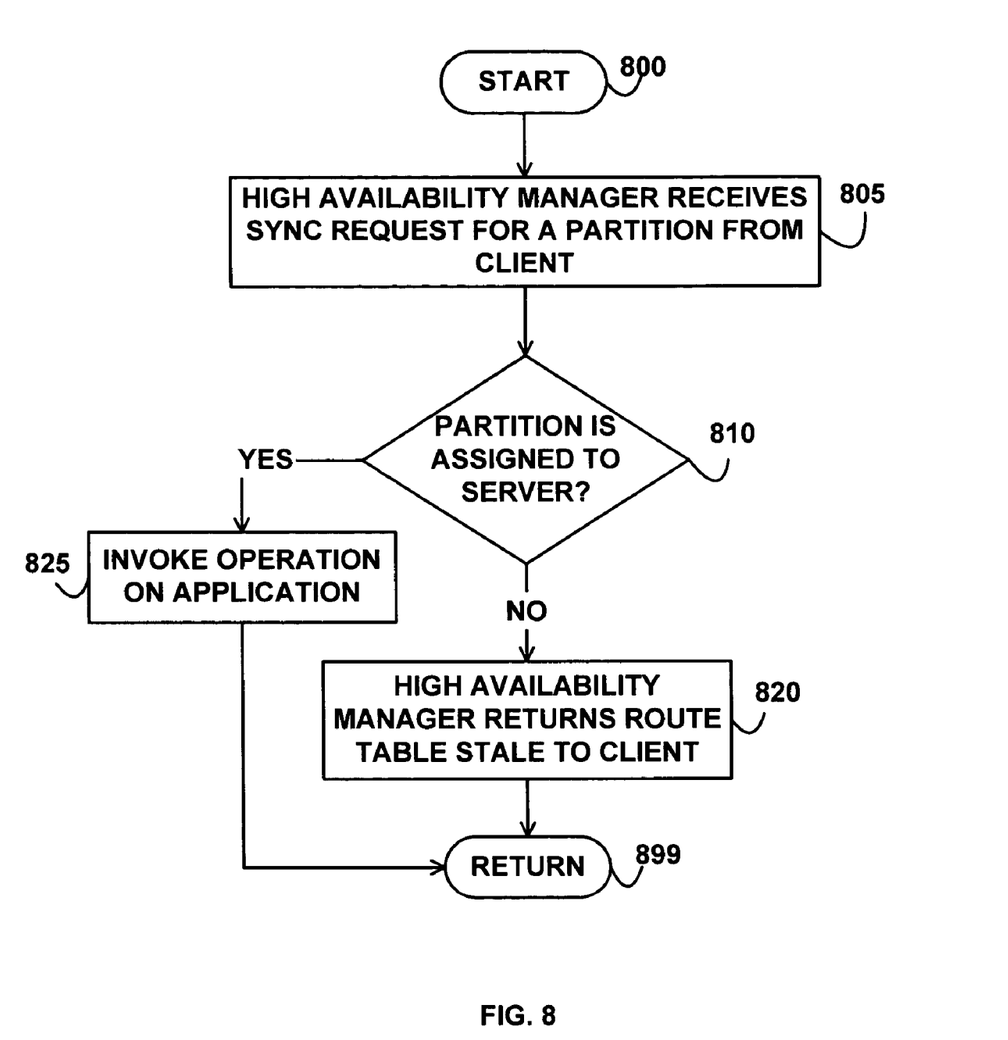
FIG. 8 depicts a flowchart of example processing for determining whether an entry in the routing table is stale, according to an embodiment of the invention.

FIG. 8 depicts a flowchart of example processing for determining whether an entry in the routing table 152 is stale, according to an embodiment of the invention. It is possible that the client 132 will send a request to the server 100 just after the partition is moved to another server. If this happens, the target server 100 returns an exception back to the client 132, as described in FIG. 8.

Control begins at block 800. Control then continues to block 805 where the high availability manager 156 receives a sync request for a partition from the client 132. Control then continues to block 810 where the high availability manger 156 determines whether the partition is assigned to the server 100 by examining the entry in the routing table 152 that is associated with the partition associated with the sync request and determining whether the server field 330 matches the server 100. If the determination at block 810 is true, then the partition is assigned to the server 100, so control continues to block 825 where the operation on the application 148 is invoked. Control then continues to block 899 where the logic of FIG. 8 returns.

If the determination at block 810 is false, then the partition is not assigned to the server 100, so control continues to block 820 where the high availability manager 156 returns a routing table stale error to the requesting client 132. Control then continues to block 899 where the logic of FIG. 8 returns.

Figure 9:
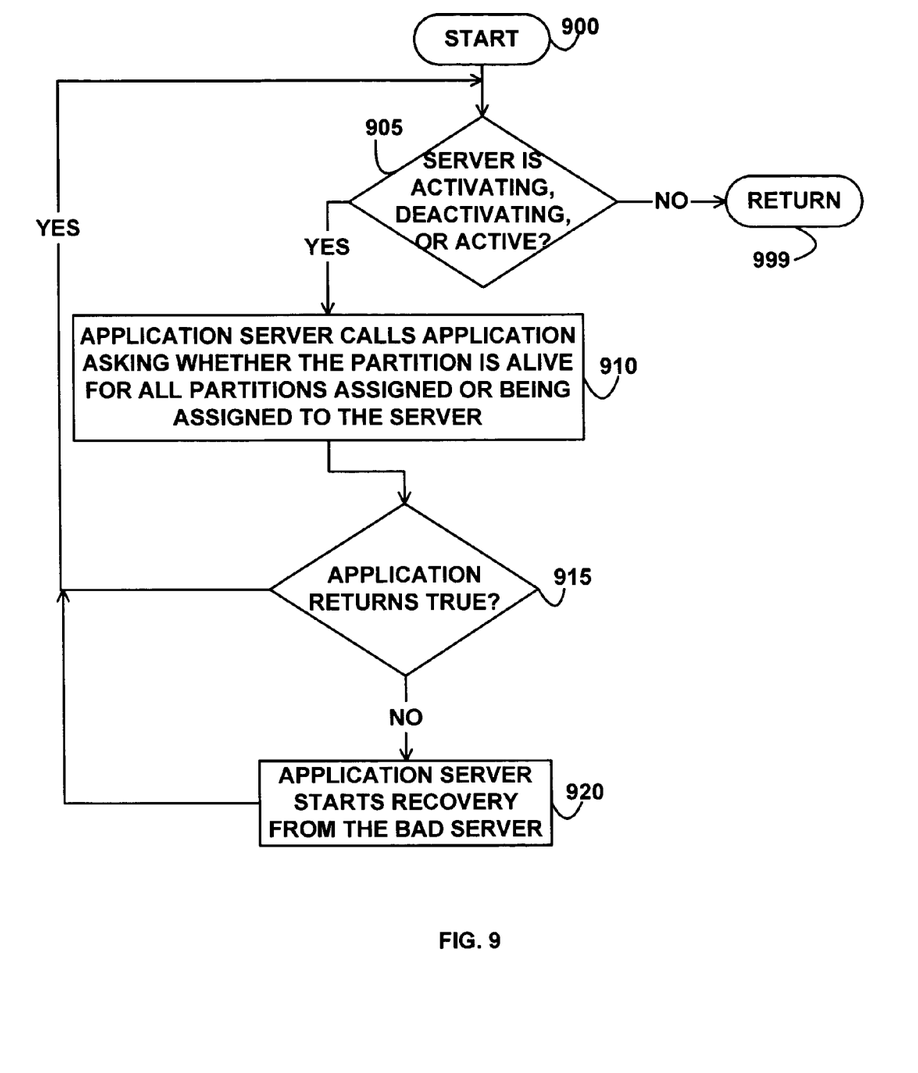
FIG. 9 depicts a flowchart of example processing for determining the health of a partition, according to an embodiment of the invention.

FIG. 9 depicts a flowchart of example processing for determining the health of a partition, according to an embodiment of the invention. Control begins at block 900. Control then continues to block 905 where the application server 144 determines whether the server 100 is activating a partition 150, deactivating a partition 150, or has partitions 150 active. If the determination at block 905 is true, then the server 100 is activating a partition 150, deactivating a partition 150, or has partitions 150 active, so control continues to block 910 where the application server 144 calls the application 148 for all partitions 150, to determine whether the partition 150 is active for all partitions assigned or being assigned to the server 100.

Control then continues to block 915 where the application server 144 determines whether the application 148 returned true. If the application 148 returns true, then the partition 150 is active, so control returns to block 905, as previously described above. If the application 148 returns false, then the partition 150 is not active, so control continues to block 920 where the application server 144 starts recovery for the bad server. Control then returns to block 905, as previously described above.

If the determination at block 905 is false, then the server 100 is not activating a partition, deactivating a partition, or does not have partitions active, so control continues to block 999 where the logic of FIG. 9 returns.

Figure 10:
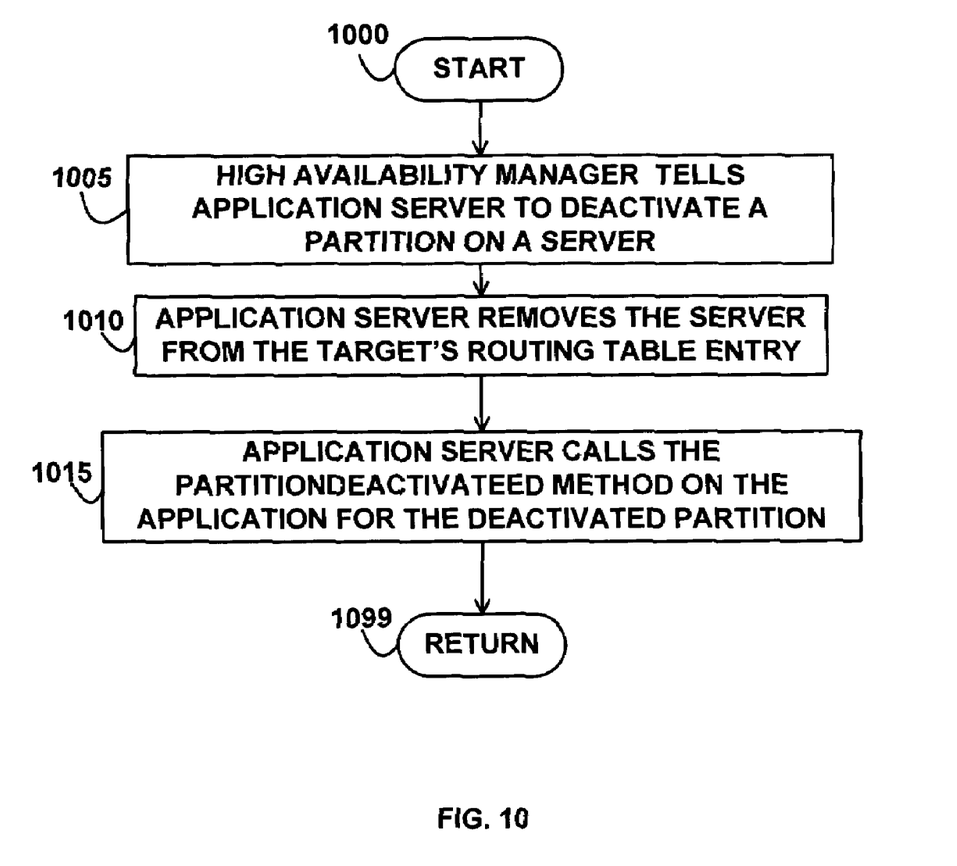
FIG. 10 depicts a flowchart of example processing for deactivating a partition, according to an embodiment of the invention.

FIG. 10 depicts a flowchart of example processing for deactivating a partition 150, according to an embodiment of the invention. Control begins at block 1000. Control then continues to block 1005 where the high availability manager 156 instructs the application server 144 to deactivate the partition 150. Control then continues to block 1010 where the application server 144 removes the server from the entry in the routing table 152 that is associated with the deactivated partition 150. Control then continues to block 1015 where the application server 144 calls the partitionDeactivated method on the application 148 for the deactivated partition. Control then returns to block 1099 where the logic of FIG. 10 returns.

FIG. 11 depicts a flowchart of example processing for activating a partition, according to an embodiment of the invention. Control begins at block 1100. Control then continues to block 1105 where the high availability manager 156 assigns the reported active partitions to the servers 100 based on the policies and quorum (if enabled) and informs the application server 144 of the active partitions on its server 100.

Control then continues to block 1105 where the application server 144 calls the partitionActivated method for the partition. Control then continues to block 1110 where, after the partitionActivated method returns, the application server 144 updates the routing table 152 to reflect the assignments of the partitions. In various embodiments, the application server 144 updates the routing table 152 either asynchronously or by receiving a new copy of the routing table 152 via a response from the server 100 that is hosting the partition. Control then continues to block 1199 where the logic of FIG. 11 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   determining a plurality of active partitions of an application; and
   assigning the plurality of active partitions to a plurality of servers via a routing table, wherein assigning further comprises setting identifiers of the active partitions and the associated plurality of servers in the routing table;
   sending the routing table to a client, wherein the client desires to send requests to the active partitions via the routing table;
   determining whether the routing table is stale;
   instructing the client to wait if the routing table is stale; and
   creating virtual queues for the partitions, wherein the virtual queues are to receive messages from the client.

2. The method of claim 1, further comprising:
reassigning at least one of the plurality of active partitions if one of the plurality of servers has failed.

3. The method of claim 1, further comprising:
reassigning at least one of the plurality of active partitions if the plurality of active partitions have a loading imbalance.

4. A method for configuring a computer, comprising:
configuring the computer to determine a plurality of active partitions of an application;
configuring the computer to assign the plurality of active partitions to a plurality of servers via a routing table, wherein configuring the computer to assign further comprises setting identifiers of the active partitions and the associated plurality of servers in the routing table;
configuring the computer to send the routing table to a client, wherein the client desires to send requests to the active partitions via the routing table;
configuring the computer to determine whether the routing table is stale;
configuring the computer to instruct the client to wait if the routing table is stale; and
configuring the computer to create virtual queues for the partitions, wherein the virtual queues are to receive messages from the client.

5. The method of claim 4, further comprising:
configuring the computer to reassign at least one of the plurality of active partitions if one of the plurality of servers has failed.

6. The method of claim 4, further comprising:
configuring the computer to reassign at least one of the plurality of active partitions if the plurality of active partitions have a loading imbalance.

* * * * *